US008514977B2

(12) United States Patent
Oh et al.

(10) Patent No.: US 8,514,977 B2
(45) Date of Patent: Aug. 20, 2013

(54) TRANSMISSION APPARATUS, RECEPTION APPARATUS, TRANSMISSION METHOD, AND RECEPTION METHOD OF WIRELESS COMMUNICATION SYSTEM

(75) Inventors: Jung-yeol Oh, Daejeon (KR); Jaehwan Kim, Daejeon (KR); Hyung Soo Lee, Daejeon (KR); Jae Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 91 days.

(21) Appl. No.: 12/951,411

(22) Filed: Nov. 22, 2010

(65) Prior Publication Data

US 2011/0122969 A1 May 26, 2011

(30) Foreign Application Priority Data

Nov. 23, 2009 (KR) .................. 10-2009-0113489

(51) Int. Cl.
*H03C 3/00* (2006.01)
(52) U.S. Cl.
USPC ............................ 375/302; 375/298; 375/308
(58) Field of Classification Search
USPC .................................. 375/302, 298, 308
See application file for complete search history.

(56) References Cited

U.S. PATENT DOCUMENTS

| 2003/0156534 A1* | 8/2003 | Coulson et al. ............ 370/210 |
| 2005/0249312 A1* | 11/2005 | Bode et al. ............... 375/308 |
| 2007/0165591 A1* | 7/2007 | Higure et al. ............. 370/346 |
| 2010/0135431 A1 | 6/2010 | Kim et al. |

FOREIGN PATENT DOCUMENTS

| JP | 05-129860 | 5/1993 |
| JP | 11-136207 | 5/1999 |
| KR | 10-2010-0062688 | 6/2010 |

* cited by examiner

*Primary Examiner* — Kabir A Timory
(74) *Attorney, Agent, or Firm* — Staas & Halsey LLP

(57) ABSTRACT

A transmission apparatus according to an exemplary embodiment of the present invention comprises a serial/parallel (S/P) converter for converting an input bit stream into a plurality of symbols each including 3 bits, a differential modulator for generating differential encoded symbols by applying π/4 phase rotation to each of the symbols, up-samplers for up-sampling the differential encoded symbols, filters for filtering the up-sampled symbols, digital/analog (D/A) converters for converting the filtered symbols into analog signals, and a quadrature modulator for performing quadrature modulation on the converted analog signals.

6 Claims, 14 Drawing Sheets

TRANSMISSION APPARATUS, RECEPTION APPARATUS, TRANSMISSION METHOD, AND RECEPTION METHOD OF WIRELESS COMMUNICATION SYSTEM

CROSS-REFERENCE TO RELATED APPLICATION

This application claims priority to and the benefit of Korean Patent Application No. 10-2009-0113489 filed in the Korean Intellectual Property Office on Nov. 23, 2009, the entire contents of which are incorporated herein by reference.

BACKGROUND OF THE INVENTION (a) Field of the Invention

The present invention relates to a transmission apparatus, a reception apparatus, a transmission method, and a reception method of a wireless communication system.

(b) Description of the Related Art

When a wireless communication system is designed, there is a growing demand for high data communication speed, realization of low power operation, and good communication performance. Accordingly, the three demands need to be sufficiently taken into consideration when a method of processing signals in a transmission apparatus and a reception apparatus of a wireless communication system is selected.

Meanwhile, to maintain precise timing synchronization in a wireless communication system, a method of reducing a frequency offset between a transmission apparatus and a reception apparatus using a high precision crystal oscillator can be used. However, with a communication system, such as a Wireless Body Area Network (WBAN) for wireless communication between an implant device within the human body and a device outside the human body, is not easy to adopt a precise crystal oscillator because it has to be implemented with an ultra-small size and low power operation.

Further, in wireless communication with a synchronization method, the problem of a frequency offset occurring when data are demodulated can be solved by providing a pilot channel for synchronization acquisition and restoring an accurate frequency by estimating a frequency and a phase offset using a received pilot signal. The performance of such a synchronization reception method is greatly changed depending on how accurately the frequency and the restored phase offset are.

In packet-based wireless communications, such as a Wireless Personal Area Network (WPAN) and the WBAN, a method of estimating and compensating for a frequency error using a preamble is used because it is difficult to additionally support the pilot channel. However, in a reception method estimating synchronization using the preamble, a difference between a frequency offset that is actually applied and an estimated frequency offset generates a remaining frequency offset, thereby degrading the performance of a receiver.

A differential modulation/demodulation method can be used to implement a receiver in an asynchronization reception method performing modulation using a phase difference between symbols and performing demodulation using a phase difference between a previous symbol and a current symbol. Accordingly, the differential modulation/demodulation method can greatly reduce the influence of performance degradation on a change in the frequency offset occurring in the synchronization reception method. Further, the differential modulation/demodulation method is robust to a phase shift of a small range occurring between neighboring symbols, and it can reduce the effect of a phase noise. Moreover, an asynchronous receiver using differential demodulation is advantageous in that it can be simply realized and can greatly reduce complexity because additional circuits for channel estimation and compensation are not required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmission apparatus, a reception apparatus, a transmission method, and a reception method of a wireless communication system having advantages of improving the performance for a back-off characteristic of a nonlinear element due to a sharp phase shift, preventing performance degradation for a change in the frequency offset, and reducing complexity in a wireless communication system.

An exemplary embodiment of the present invention provides a transmission apparatus including a serial/parallel (S/P) converter for converting an input bit stream into symbol including 3 bits, a differential modulator for generating differential encoded symbols by applying $\pi/4$ phase rotation to each of the symbols, up-samplers for up-sampling the differential encoded symbols, filters for filtering the up-sampled symbols, digital/analog (D/A) converters for converting the filtered symbols into analog signals, and a quadrature modulator for performing quadrature modulation on the converted analog signals.

The differential modulator can place a symbol waveform in a front part when a first bit of the symbol is 0 and place the symbol waveform in a rear part when a second bit of the symbol is 1.

The differential modulator generates a complex variable using second and third bits of the symbol, and generates a current differential encoded symbol by multiplying a previous differential encoded symbol and the complex variable. The differential modulator generates a complex variable using second and third bits of the symbol, and generates the phase of a current differential encoded symbol by multiplying the phase of a previous differential encoded symbol and the phase of the complex variable. Here, the phase of an initial symbol is 0°.

The filter can comprise a square root raised cosine (SRRC) filter.

The filter has a time cycle that is half a cycle of the up-sampled symbol, and can have a roll-off factor of 1 to minimize intra-symbol interference.

Another exemplary embodiment of the present invention provides a method of a transmission apparatus of a wireless communication system transmitting a signal, including receiving an input bit stream, converting the input bit stream into a plurality of symbols each including 3 bits, generating differential encoded symbols by applying $\pi/4$ phase rotation to each of the symbols, up-sampling the differential encoded symbols, filtering the up-sampled symbols, converting the filtered symbols into analog signals, and performing quadrature modulation on the converted analog signals and transmitting the result.

Generating the differential encoded symbols can include placing a symbol waveform in a front part when a first bit of the symbol is 0, and placing the symbol waveform in a rear part when a second bit of the symbol is 1.

Generating the differential encoded symbols includes generating a complex variable using second and third bits of the symbol, and generating a current differential encoded symbol by multiplying a previous differential encoded symbol and the complex variable. Here, an initial symbol can be 1.

Generating the differential encoded symbols includes generating a complex variable using second and third bits of the symbol, and generating a phase of a current differential encoded symbol by multiplying a phase of a previous differential encoded symbol and a phase of the complex variable. Here, the phase of an initial symbol can be 0°.

Yet another exemplary embodiment of the present invention provides a reception apparatus, including a comparator for receiving symbols, each configured to include 3 bits and subject to differential encoding, and comparing a magnitude of an even-numbered symbol and a magnitude of an odd-numbered symbol, a differential decoder for decoding any one of the even-numbered symbols and the odd-numbered symbols, and a parallel/serial (P/S) converter for converting the decoded symbols in series.

The comparator can determine a first bit of the 3 bits to be 1 when the magnitude of the even-numbered symbol is smaller than or equal to the magnitude of the odd-numbered symbol, and determine the first bit of the 3 bits to be 0 when the magnitude of the even-numbered symbol is greater than the magnitude of the odd-numbered symbol.

The differential decoder can include symbol delay units for generating delayed symbols by delaying a symbol having a greater magnitude, from among the even-numbered symbol and the odd-numbered symbol, a conjugate complex multiplier for performing a conjugate complex multiplication on each of the delayed symbols and the symbol having a greater magnitude, and signal detectors for decoding the respective conjugate complex multiplication results.

The signal detector can determine second and third bits of the 3 bits based on the decoding results.

The reception apparatus can further include a quadrature demodulator for receiving a differentiated symbol from a transmission apparatus and performing quadrature demodulation on the differentiated symbol, analog/digital (A/D) converters for converting the quadrature-demodulated symbols into respective digital symbols, filters for filtering the converted digital symbols, and a synchronizer for sampling the filtered symbols and transmitting the sampling results to the comparator.

Yet another exemplary embodiment of the present invention provides a method of a reception apparatus of a wireless communication system receiving a signal, including comparing a magnitude of an even-numbered symbol and a magnitude of an odd-numbered symbol from among symbols each configured to include 3 bits and differentiated by applying $\pi/4$ phase rotation to each of the symbols, decoding a symbol having a greater magnitude from among the even-numbered symbol and the odd-numbered symbol, and converting the decoded symbols in series.

Comparing the magnitude of the even-numbered symbol and the magnitude of the odd-numbered symbol can include determining a first bit of the 3 bits to be 1 when the magnitude of the even-numbered symbol is smaller than or equal to the magnitude of the odd-numbered symbol, and determining the first bit of the 3 bits to be 0 when the magnitude of the even-numbered symbol is greater than the magnitude of the odd-numbered symbol.

Decoding the symbol having a greater magnitude can include generating delayed symbols by delaying the symbol having a greater magnitude from among the even-numbered symbol and the odd-numbered symbol, performing a conjugate complex multiplication on each of the delayed symbols and the symbol having a greater magnitude, and decoding the conjugate complex multiplication results.

Decoding the symbol having a greater magnitude can further include determining second and third bits of the 3 bits based on the decoding results.

The reception method can further comprise receiving the differential encoded symbol from a transmission apparatus and performing quadrature demodulation on the differential encoded symbol, converting the quadrature-demodulated symbols into digital symbols, filtering the converted digital symbols, and sampling the filtered symbols and transmitting the sampling results.

DETAILED DESCRIPTION OF THE EMBODIMENTS

Figure 1:
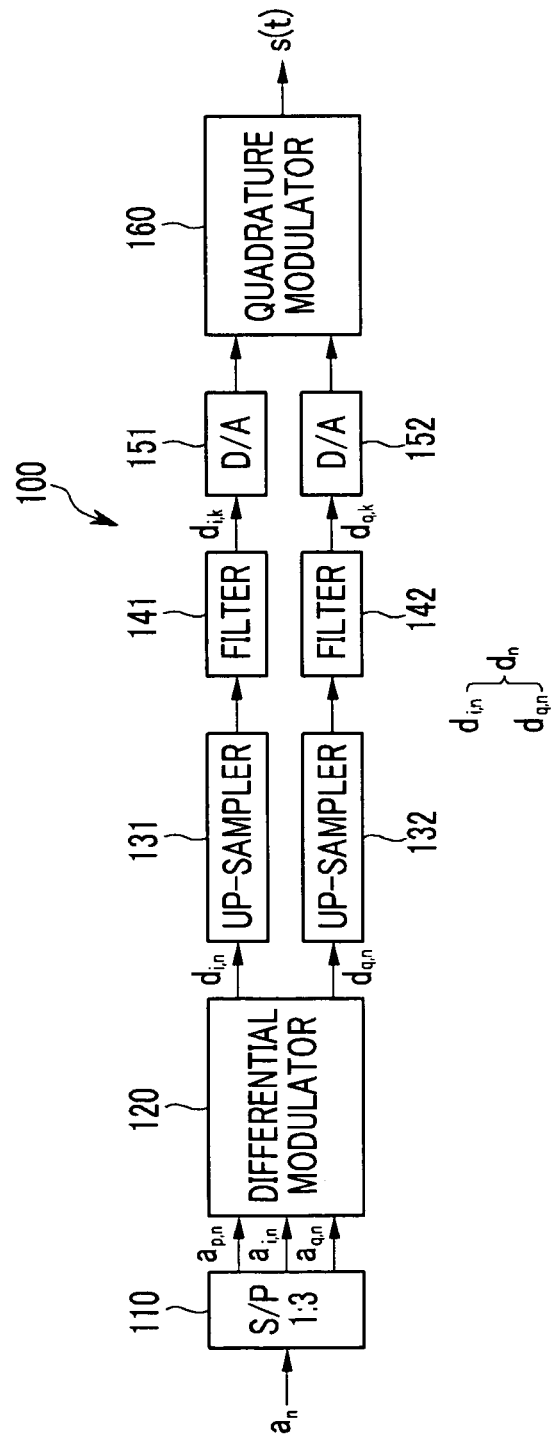
FIG. 1 is a block diagram showing a transmission apparatus of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

The transmission apparatus of a wireless communication system according to an exemplary embodiment of the present invention is described in detail below with reference to FIG. 1.

FIG. 1 is a block diagram showing the transmission apparatus of the wireless communication system according to the exemplary embodiment of the present invention.

Referring to FIG. 1, the transmission apparatus 100 according to the exemplary embodiment of the present invention includes a serial/parallel (S/P) converter 110, a differential modulator 120, up-samplers 131 and 132, filters 141 and 142, digital/analog (D/A) converters 151 and 152, and a quadrature modulator 160.

The S/P converter 110 receives an input bit stream $a_n$, and symbolizes the input bit stream $a_n$ into a plurality of symbols each including 3 bits $a_{p,n}$, $a_{i,n}$, and $a_{q,n}$. Accordingly, a relationship between a time cycle $T_b$ of the input bit stream $a_n$ and a time cycle $T_s$ of each of the symbols $a_{p,n}$, $a_{i,n}$, and $a_{q,n}$ can be expressed using the following Equation 1.

$$T_s = 3T_b \quad \text{[Equation 1]}$$

The differential modulator 120 receives the symbols $a_{p,n}$, $a_{i,n}$, and $a_{q,n}$ and generates differential encoded symbols $d_n$ by applying π/4 phase rotation to each of the symbols. This process is described in detail with reference to FIG. 2.

Figure 2:
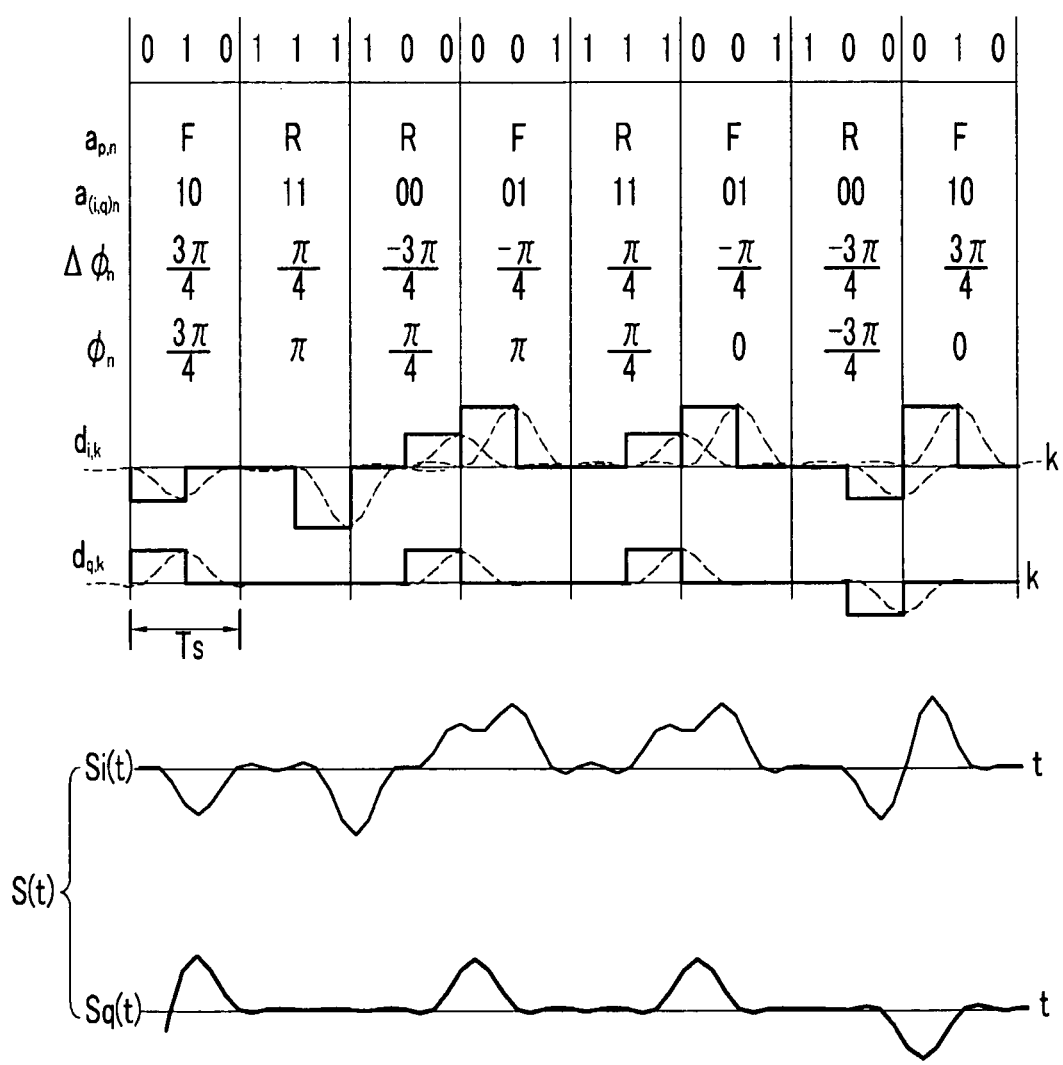
FIG. 2 is a diagram illustrating a method of the differential modulator of the transmission apparatus according to an exemplary embodiment of the present invention modulating symbols into differential encoded symbols.

FIG. 2 is a diagram illustrating a method of the differential modulator of the transmission apparatus according to an exemplary embodiment of the present invention modulating symbols into differential encoded symbols.

Referring to FIG. 2, for example, if the input bit stream $a_n$ inputted to the S/P converter 110 is "010111100001111001100010", the input bit stream $a_n$ is converted into a plurality of the symbols $a_{p,n}$, $a_{i,n}$, and $a_{q,n}$ each including 3 bits through the S/P converter 110 and then output.

In the case in which the first bit $a_{p,n}$ of each of the symbols $a_{p,n}$, $a_{i,n}$, and $a_{q,n}$ is "0", the differential modulator 120 places a symbol waveform in the front part F and a silence period in the rear part R. In the case in which the first bit $a_{p,n}$ of each of the symbols $a_{p,n}$, $a_{i,n}$, and $a_{q,n}$ is "1", the differential modulator 120 places the silence period in the front part F and the symbol waveform in the rear part R. Further, the differential modulator 120 generates a complex variable $A_n$ by mapping the second bit $a_{p,n}$ and the third bit $a_{i,n}$ of each of the symbols $a_{p,n}$, $a_{i,n}$, $a_{q,n}$ to a gray-coded complex secondary plane having four phases. The complex variable $A_n$ has a phase $\Delta P_n$ for a phase shift. The phase can be determined as in the following Table 1.

TABLE 1

| Pattern of (ai, n, aq, n) | Complex variable $A_n$ | Phase $\Delta P_n$ |
|---|---|---|
| 11 | $(1+j)/\sqrt{2}$ | $\pi/4$ |
| 01 | $(1-j)/\sqrt{2}$ | $-\pi/4$ |
| 10 | $(-1+j)/\sqrt{2}$ | $3\pi/4$ |
| 00 | $(-1-j)/\sqrt{2}$ | $-3\pi/4$ |

The phase $\Delta P_n$ according to the input bit stream $a_n$ is determined as shown in FIG. 2 in accordance with Table 1.

Further, the differential modulator 120 determines the differential encoded symbols in accordance with the following Equation 2.

$$d_n = d_{n-1} \cdot A_n \quad \text{[Equation 2]}$$

Assuming that a current differential encoded symbol is $d_n$ and a previous differential encoded symbol is $d_{n-1}$, the current differential encoded symbols $d_n$ is determined by multiplying a current complex variable $A_n$ and the previous differential encoded symbol $d_{n-1}$.

Here, the phase of an initial symbol is set to 0° (=1). Equation 2 can be converted into the following Equation 3 according to a phase relation.

$$P_n = P_{n-1} \times P_n \quad \text{[Equation 3]}$$

That is, the differential modulator 120 generates a phase $P_n$ of the current differential encoded symbol by adding the phase $\Delta P_n$ of a complex variable to a phase $P_{n-1}$ of the previous differential encoded symbol.

Referring back to FIG. 1, each of the up-samplers 131 and 132 up-samples the differential encoded symbol $d_n$ L times.

The filters 141 and 142 are transmitted pulse shaping filters for limiting the bands of up-sampled symbols $d_n$ and are configured to output respective filtered signals $d_{i,k}$ and $d_{q,k}$. The filtered signals $d_{i,k}$ and $d_{q,k}$ form a transmission signal form while overlapping with each other as shown in FIG. 2. The filters 141 and 142 can be, for example, square root raised cosine (SRRC) filters. Although other filters than the SRRC filter can be used as the filters 141 and 142, transmission filters capable of minimizing intra-symbol interference can be used as the filters 141 and 142 because the amount of information is increased due to the orthogonality of the front part and the rear part within one symbol. A controlled roll-off factor β can be used. Further, the time cycle of each of the filters 141 and 142 can be a half cycle $T_p$ of the symbol cycle $T_s$ as in the following Equation 4 rather than the symbol cycle $T_s$.

$$T_p = T_s/2 \quad \text{[Equation 4]}$$

Assuming that the roll-off factor 13 for minimizing intra-symbol interference is "1" and a shaping time cycle is $T_s/2$, the following Equation 5 can be produced.

$$p(t) = \frac{4\beta}{\pi\sqrt{T_p}} \frac{\cos[\pi(1+\beta)t/T_p] + \dfrac{\sin[\pi(1-\beta)t/T_p]}{4\beta(t/T_p)}}{[1-(4\beta t/T_p)^2]} \quad \text{[Equation 5]}$$

$$= \frac{4\sqrt{2}}{\pi\sqrt{T_s}} \frac{\cos[4\pi t/T_s]}{[1-(8t/T_s)^2]}, \quad (\beta=1, \ T_p = T_s/2)$$

The D/A converters 151 and 152 convert transmission shaping filtered signals $d_{i,k}$ and $d_{q,k}$ into respective analog signals in accordance with the following Equation 6.

$$s(t) = \sqrt{2E_b} \sum_k d_k p(t - kT_s/2) \qquad \text{[Equation 6]}$$

The analog signal s(t) has a form such as that shown in FIG. 2.

The quadrature modulator 160 performs quadrature modulation on the analog signal s(t) and outputs the result.

The transmission outputs of the transmission apparatus according to some exemplary embodiments of the present invention are described in detail below with reference to FIGS. 3 to 10.

Figure 3:
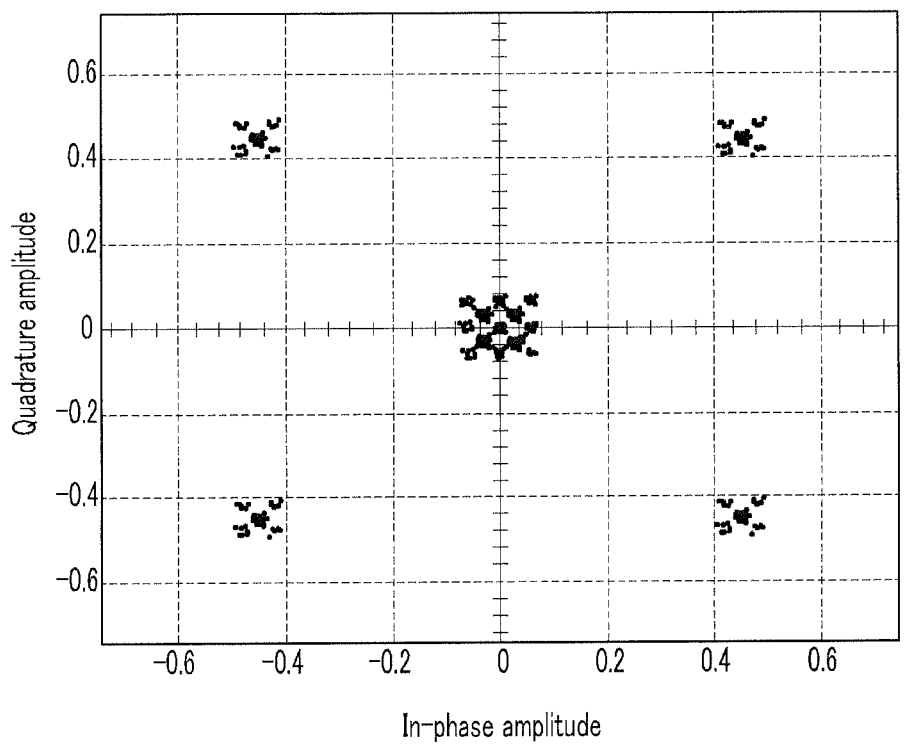
FIG. 3 is a graph showing the transmission output of the transmission apparatus according to a phase silence shift keying (PSSK) method using a scatter diagram.
Figure 4:
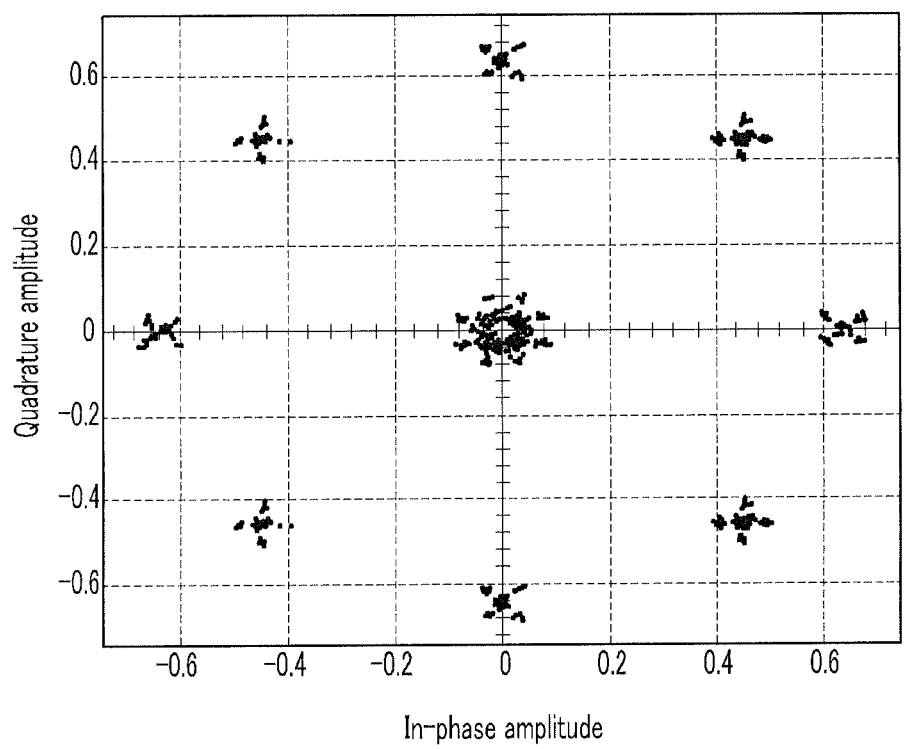
FIG. 4 is a graph showing the transmission output of the transmission apparatus according to an exemplary embodiment of the present invention using a scatter diagram.

FIG. 3 is a graph showing the transmission output of the transmission apparatus according to the PSSK method using a scatter diagram, and FIG. 4 is a graph showing the transmission output of the transmission apparatus according to an exemplary embodiment of the present invention using a scatter diagram.

Referring to FIG. 3, four constellation points can be checked on the space in the transmission output of the transmission apparatus according to the PSSK method. Referring to FIG. 4, in the transmission output of the transmission apparatus according to the exemplary embodiment of the present invention, since the constellation points of a symbol are generated on the space in which a current symbol is rotated by π/4 in a previous symbol, eight constellation points can be checked on the space.

Figure 5:
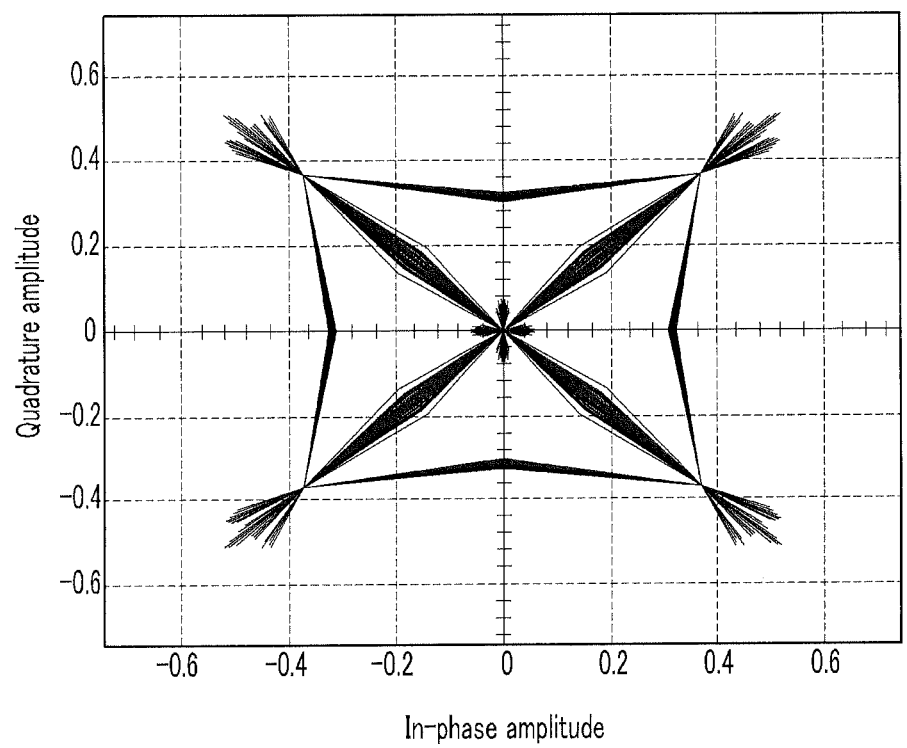
FIG. 5 is a graph showing the trajectory of an analog transmission signal of the transmission apparatus according to the PSSK method on a complex plane using a signal trajectory diagram.
Figure 6:
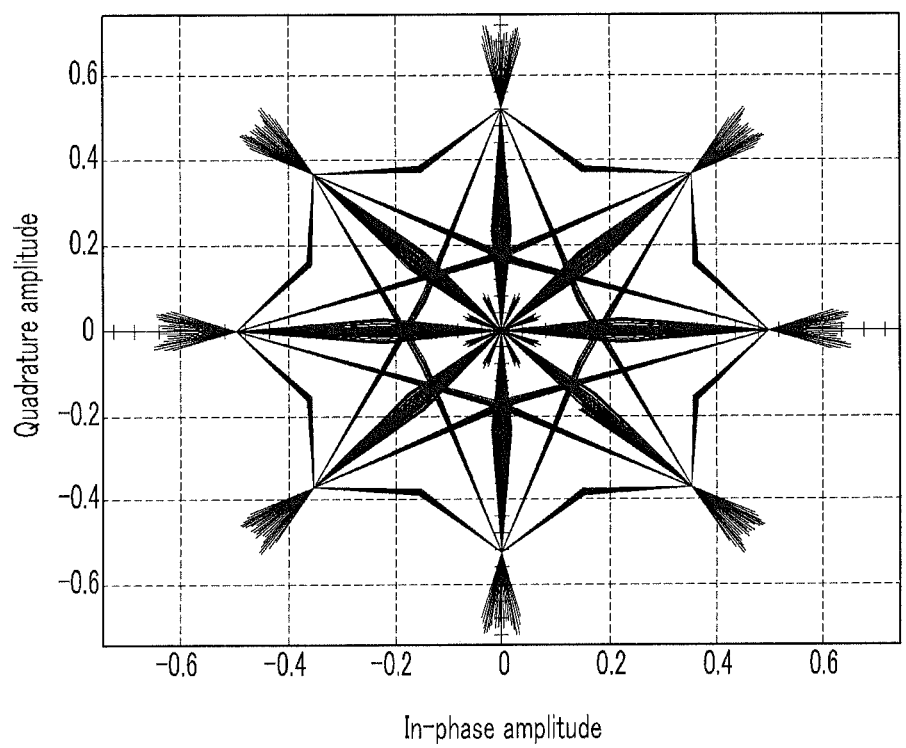
FIG. 6 is a graph showing the trajectory of an analog transmission signal of the transmission apparatus according to an exemplary embodiment of the present invention on a complex plane using a signal trajectory diagram.

FIG. 5 is a graph showing the trajectory of an analog transmission signal of the transmission apparatus according to the PSSK method on a complex plane using a signal trajectory diagram, and FIG. 6 is a graph showing the trajectory of an analog transmission signal of the transmission apparatus according to an exemplary embodiment of the present invention on a complex plane using a signal trajectory diagram.

Referring to FIG. 5, the trajectory of an analog transmission signal of the transmission apparatus according to the PSSK method using the signal trajectory diagram draws the trajectory of a diagonal direction to the trajectory of a square. Here, since an abrupt phase shift of 180° is generated, a spectrum distortion resulting from a nonlinear element, such as an amplifier of a wireless frequency domain, can be generated. To compensate for the degraded nonlinear characteristic, the loss of power can be generated through back-off which is the operating region of the amplifier.

Referring to FIG. 6, in the trajectory of an analog transmission signal of the transmission apparatus according to the exemplary embodiment of the present invention, an abrupt phase shift of 180° is not generated, but a phase shift of a maximum of 135° is generated. Accordingly, the occurrence of a spectrum distortion resulting from a nonlinear element, such as that in the analog transmission signal of a transmission apparatus according to the PSSK method, can be prevented.

Figure 7:
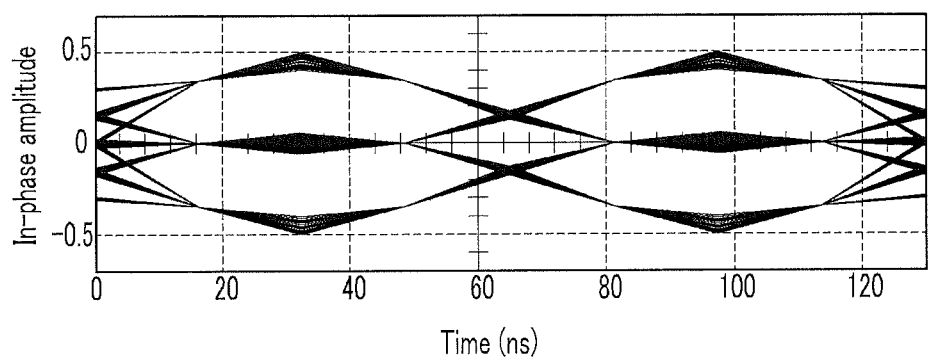
FIG. 7 is a graph showing the output of an in-phase amplitude signal, from among the transmission signals of the transmission apparatus according to the PSSK method, using an eye diagram.
Figure 8:
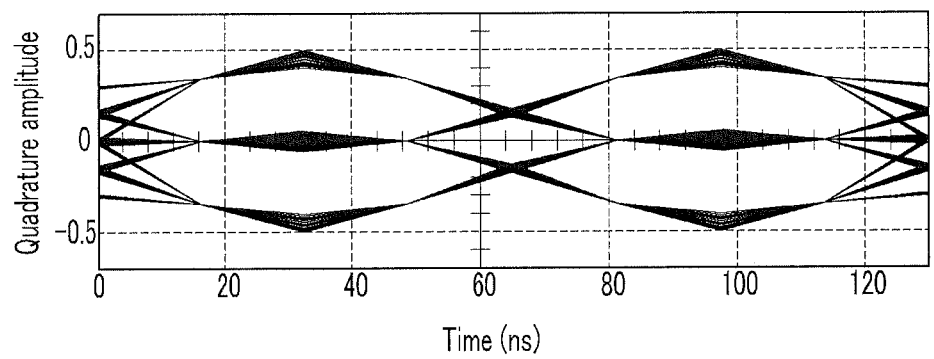
FIG. 8 is a graph showing the output of a quadrature amplitude signal, from among the transmission signals of the transmission apparatus according to the PSSK method, using an eye diagram.
Figure 9:
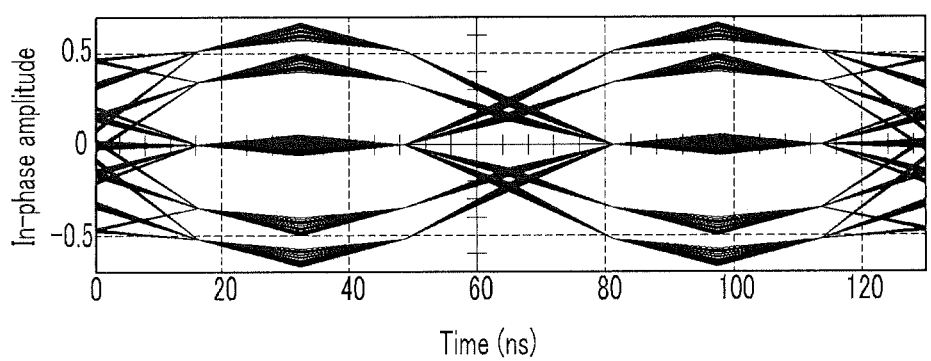
FIG. 9 is a graph showing the output of an in-phase amplitude signal, from among the transmission signals of the transmission apparatus according to an exemplary embodiment of the present invention, using an eye diagram.
Figure 10:
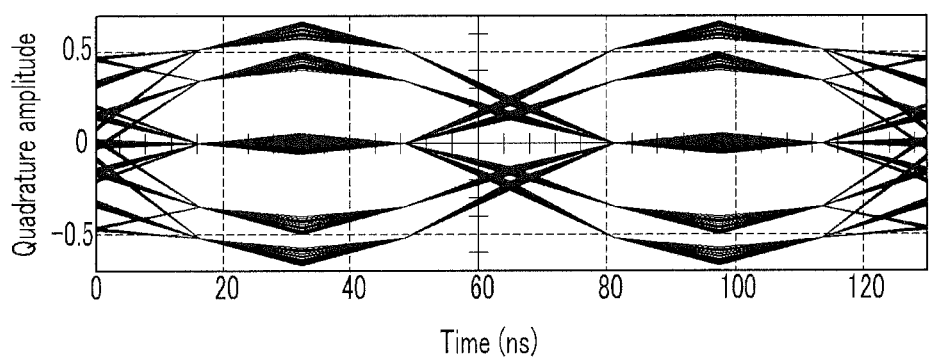
FIG. 10 is a graph showing the output of a quadrature amplitude signal, from among the transmission signals of the transmission apparatus according to an exemplary embodiment of the present invention, using an eye diagram.

FIG. 7 is a graph showing the output of an in-phase amplitude (I) signal, from among the transmission signals of the transmission apparatus according to the PSSK method, using an eye diagram. FIG. 8 is a graph showing the output of a quadrature amplitude (Q) signal, from among the transmission signals of the transmission apparatus according to the PSSK method, using an eye diagram. FIG. 9 is a graph showing the output of an I signal, from among the transmission signals of the transmission apparatus according to an exemplary embodiment of the present invention, using an eye diagram. FIG. 10 is a graph showing the output of a Q signal, from among the transmission signals of the transmission apparatus according to an exemplary embodiment of the present invention, using an eye diagram.

FIGS. 7 to 10 show signals that are restored by estimating an optimal sampling time of a maximum vertical eye opening in a receiver.

Referring to FIGS. 7 and 8, in accordance with the transmission apparatus according to the PSSK method, each of the I signal and the Q signal of the transmission output has three levels of about 0.5, 0, and −0.5. Meanwhile, referring to FIGS. 9 and 10, in accordance with the transmission apparatus according to the PSSK method, each of the I signal and the Q signal of the transmission output has four levels of about 1, 0.707, −0.707, and −1.

A transmission method of the transmission apparatus according to another exemplary embodiment of the present invention is described in detail below with reference to FIG. 11.

Figure 11:
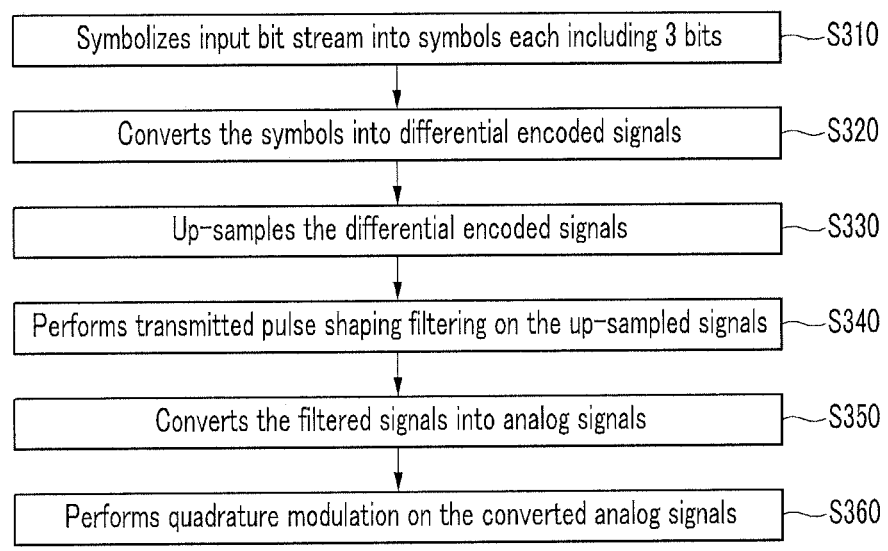
FIG. 11 is a flowchart illustrating a transmission method of a wireless communication system according to another exemplary embodiment of the present invention.

FIG. 11 is a flowchart illustrating a transmission method of a wireless communication system according to another exemplary embodiment of the present invention.

First, the input bit stream $a_n$ is received and symbolized into a plurality of symbols each including 3 bits at step S310.

The symbols are modulated into differential encoded symbols by applying π/4 phase rotation to each of the symbols at step S320. Here, the process of modulating the symbols into the differential encoded symbols includes placing a symbol waveform in the front part or the rear part according to the first bit of the symbol and generating a complex variable by mapping the second and third bits of the symbol to a gray-coded complex secondary plane having four phases. The complex variable and a previous differential encoded symbol are multiplied to produce a current differential encoded symbol. That is, a phase of a current differential encoded symbol is determined by adding a phase of the previous differential encoded symbol and a phase of the complex variable. Here, the phase of the complex variable can be π/4, π/4, 3π/4, or −3π/4.

Next, the differential encoded symbols are up-sampled at step S330, and the up-sampled signals are subject to transmitted pulse shaping filtering at step S340.

Next, the filtered signals are converted into analog signals at step S350, and the converted analog signals are subject to quadrature modulation at step S360.

A reception apparatus of a wireless communication system according to another exemplary embodiment of the present invention is described in detail below with reference to FIG. 12.

Figure 12:
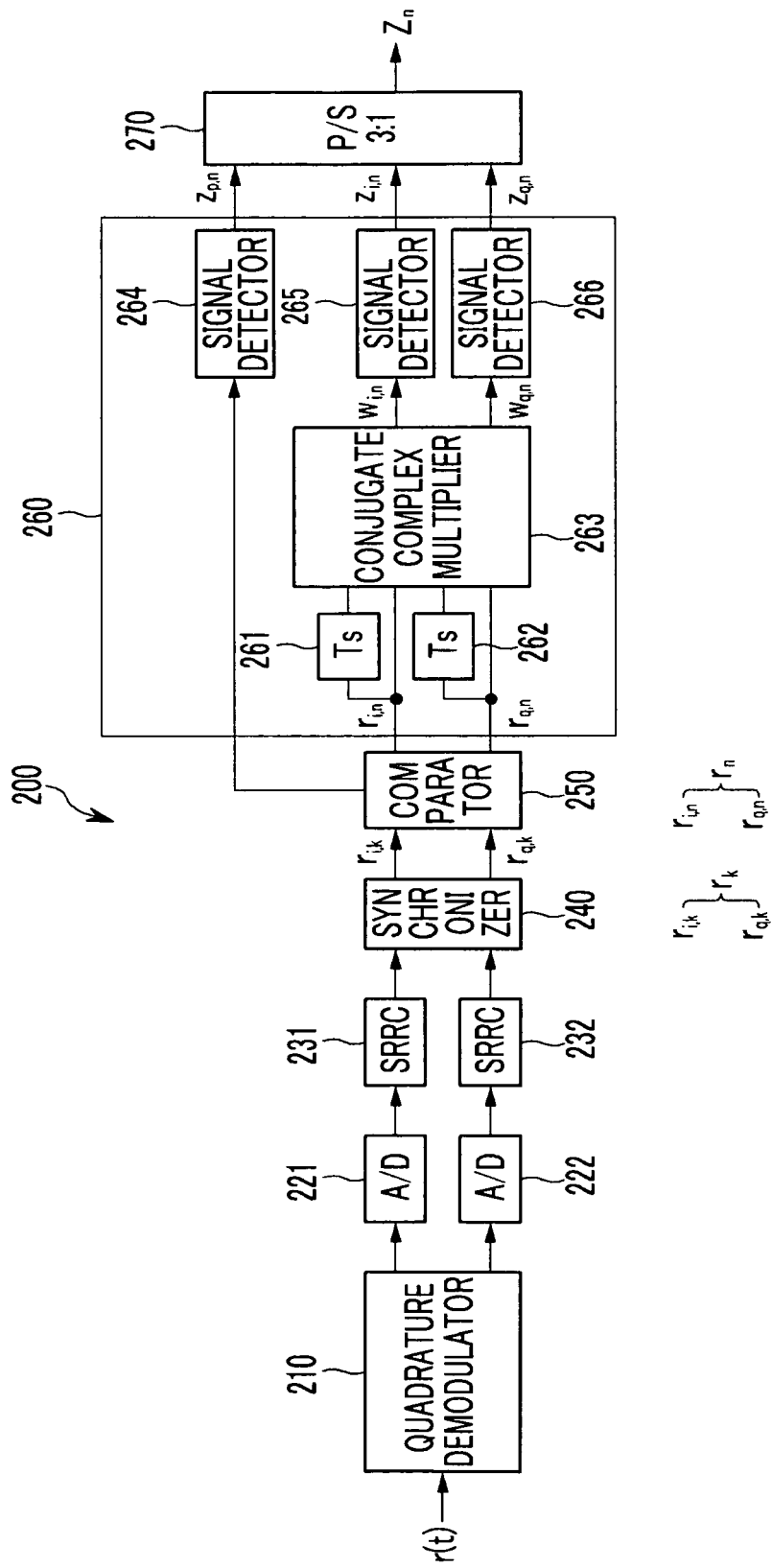
FIG. 12 is a block diagram showing a reception apparatus of a wireless communication system according to yet another exemplary embodiment of the present invention.

FIG. 12 is a block diagram showing the reception apparatus of the wireless communication system according to yet another exemplary embodiment of the present invention.

Referring to FIG. 12, the reception apparatus 200 includes a quadrature demodulator 210, analog/digital converters 221 and 222, filters 231 and 232, a synchronizer 240, a comparator 250, symbol delay units 261 and 262, a conjugate complex multiplier 263, signal detectors 264, 265, and 266, and a parallel/serial (P/S) converter 270.

The signal s(t) transmitted by the transmission apparatus 100 includes noise and a frequency error while passing through radio channels. Consequently, a signal r(t) received by the reception apparatus 200 can be expressed using the following Equation 7.

$$r(t) = e^{jv(t)}s(t-\tau) + n(t) \qquad \text{[Equation 7]}$$

where θ(t) is a composed phase signal under the influence of mismatch resulting from a local oscillator error, and n(t) is complex Gaussian white noise having a power spectrum density of $N_o/2$.

The quadrature demodulator 210 performs quadrature demodulation on the received signal r(t), and corresponds to the quadrature modulator 160 of the transmission apparatus 100.

The A/D converters 221 and 222 convert the quadrature-modulated signals into respective digital signals.

The filters 231 and 232 are matching filters for receiving the converted digital signals and outputting respective maximum output values of the input signals. The same filters as the transmission pulse shaping filters 141 and 142 of the transmission apparatus 100 can be used as the filters 231 and 232.

The synchronizer 240 acquires timing synchronization and an initial phase offset and then samples the output signals of the filters 231 and 232 at time intervals of $T_s/2$. Here, a complex expression equation of the sampled and averaged signals is as shown in the following Equation 8.

$$r_k = e^{j\{2\pi k \Delta f(T_s/2)+\theta\}} s_k + n_k \quad \text{[Equation 8]}$$

where $\Delta f$ is a factor resulting from the influence of a carrier frequency offset, and θ is an initial phase offset uniformly distributed from 0 to 2p.

The comparator 250 receives output signals $r_{i,k}$ and $r_{q,k}$ from the synchronizer 240 and finds the magnitudes of the signals based on absolute values of the signals, acquired using the following Equation 9, and then compares the magnitude of an even-numbered signal $r_{2k}$ and the magnitude of an odd-numbered signal $r_{2k+1}$.

$$|r_{2k}| = \sqrt{r_{i,2k}^2 + r_{q,2k}^2}$$

$$|r_{2k+1}| = \sqrt{r_{i,2k+1}^2 + r_{q,2k+1}^2} \quad \text{[Equation 9]}$$

The even-numbered signal $r_{2k}$ corresponds to the front part F of a symbol, and the odd-numbered signal $r_{2k+1}$ corresponds to the rear part R of the symbol.

If, as a result of the comparison, the magnitude of the even-numbered signal $r_{2k}$ is smaller than or equal to the magnitude of the odd-numbered signal $r_{2k+1}$ as in the following Equation 10, the comparator 250 determines the first bit $z_{p,n}$ of a demodulation signal to be "1" because the waveform of the signal is placed in the rear part R of the symbol. However, if, as a result of the comparison, the magnitude of the even-numbered signal $r_{2k}$ is greater than the magnitude of the odd-numbered signal $r_{2k+1}$ as in the following Equation 10, the comparator 250 determines the first bit $z_{p,n}$ of the demodulation signal to be "0".

$$z_{p,k} = \begin{cases} 1, & |r_{2k}| \le |r_{2k+1}| \\ 0, & |r_{2k}| > |r_{2k+1}| \end{cases}, \quad k = 0, 1, 2, \ldots K-1 \quad \text{[Equation 10]}$$

Further, the comparator 250 determines a signal having a greater magnitude, from among the symbols $r_n$, in accordance with the following Equation 11.

$$r_n = \begin{cases} r_{2k}, & |r_{2k}| > |r_{2k+1}| \\ r_{2k+1}, & |r_{2k}| \le |r_{2k+1}| \end{cases} \quad \text{[Equation 11]}$$

A differential decoder 260 receives the symbols $r_n$ from the comparator 250 and performs differential decoding on the received symbols $r_n$. The differential decoder 260 includes the symbol delay units 261 and 262, the conjugate complex multiplier 263, and the signal detectors 264, 264, and 266.

The symbol delay units 261 and 262 generate delayed symbols $r_{n-1}$ by delaying the symbols $r_n$ determined by the comparator 250. The conjugate complex multiplier 263 acquires an inter-symbol phase difference by performing a conjugate complex multiplication on the symbols $r_n$ and the delayed symbol $r_{n-1}$. The signal detector 264 receives the first bit $z_{p,n}$ from the comparator 250 and finally decodes and outputs the received first bit $z_{p,n}$. The signal detectors 265 and 266 receive the conjugate complex multiplication results $w_{i,n}$ and $w_{q,n}$, finally decode the conjugate complex multiplication results $w_{i,n}$ and $w_{q,n}$ in accordance with a demodulation table, such as that shown in Table 2, and output respective decoded signals $z_{i,n}$ and $z_{q,n}$.

TABLE 2

| Signs of conjugate complex multiplication results $w_{i,n}$ and $w_{q,n}$ | Decoded signals $z_{i,n}, z_{q,n}$ |
|---|---|
| +, + | 11 |
| +, − | 01 |
| −, + | 10 |
| −, − | 00 |

The operation of the differential decoder 260 described as above can be expressed using the following Equation 12.

$$w_n = r_n \cdot r_{n-1}^* \quad \text{[Equation 12]}$$

$$= s_N s_{n-1}^* e^{j2\pi\Delta fT_s} + n_n s_{n-1}^* e^{(-j2\pi(n-1)\Delta fT_s + \theta)} +$$

$$s_n n_{n-1}^* e^{(j2\pi n\Delta fT_s + \theta)} + n_n n_{n-1}^*$$

$$= e^{j(\phi_n - \phi_{n-1})} \cdot e^{j2\pi\Delta fT_s} + I(n)$$

$$= w_{i,n} + jw_{q,n}$$

wherein $I_n$ refers to mixed complex noise.

The P/S converter 270 receives the decoded signals $z_{p,n}$, $z_{i,n}$, and $z_{q,n}$ (i.e., the first, second, and third bits of the symbol), converts the received signals in series, and outputs the result as a final signal $z_n$.

The performance of the reception apparatus according to an exemplary embodiment of the present invention is described in detail below with reference to FIG. 13.

Figure 13:
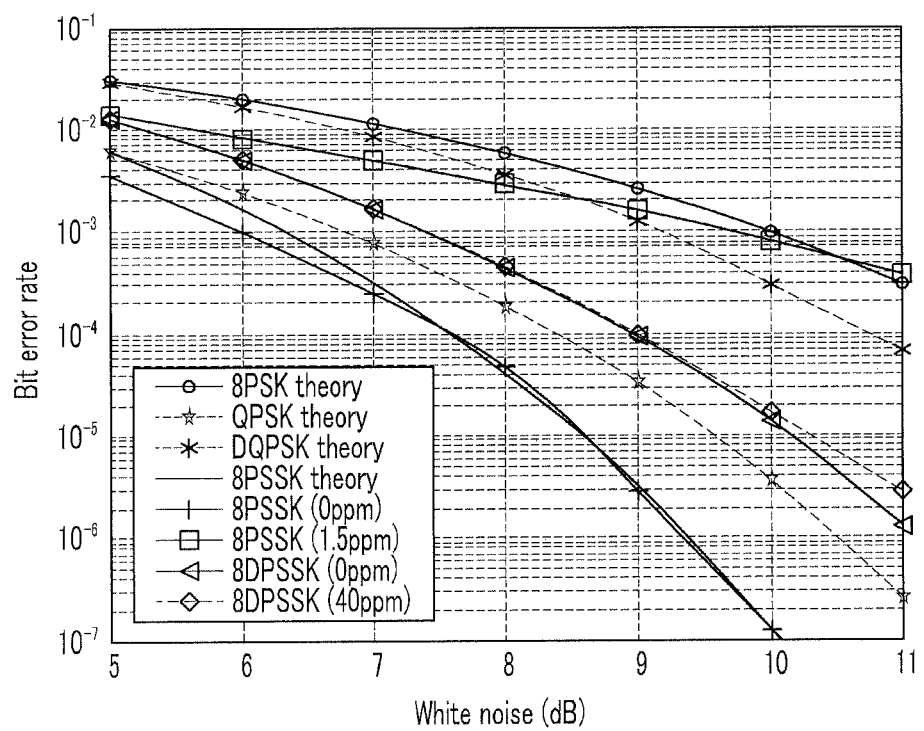
FIG. 13 is a graph showing bit error rates (BERs) according to white noise of final signals that have been received and processed by several conventional reception apparatuses and the reception apparatus according to the exemplary embodiment of the present invention.

FIG. 13 is a graph showing the bit error rates (BERs) according to the white noise of final signals that have been received and processed by several conventional reception apparatuses and the reception apparatus according to the exemplary embodiment of the present invention.

FIG. 13 shows theoretical numerical values of the BERs according to the white noise of final signals, processed by the reception apparatuses according to an 8-Phase shift keying (8PSK) method, a quadrature PSK (QPSK) method, a differential QPSK (DQPSK) method, and an 8PSSK method. The BER according to the white noise of the final signal processed by the reception apparatus using the 8PSSK method is drawn on the basis of the theory of 1.5 ppm when the frequency offset is 0 ppm. The BER according to the white noise of the final signal processed by the reception apparatus 100 according to the exemplary embodiment of the present invention is drawn on the basis of the theory of 40 ppm (8DPSSK) when the frequency offset is 0 ppm.

The gain of the 8PSSK method is 5.4 dB more than that of the 8PSK method and about 1.2 dB more than that of the QPSK method, when the BER is $10^{-6}$. However, in the case of the 8PSSK method, the influence on the remaining frequency offset remains 1.5 ppm, the performance is greatly degraded, and so a great performance degradation of 6 dB or more is generated. The gain of the reception apparatus according to the exemplary embodiment of the present invention is about 1.7 dB smaller than that of the reception apparatus using the 8PSSK method, but about 1.7 dB greater than that of the reception apparatus using the DQPSK method which is a differential method. Accordingly, the reception apparatus according to the exemplary embodiment of the present invention can have a stable performance in which performance degradation is within 0.5 dB in a frequency offset within ±40 ppm when the frequency offset is great.

A reception method of a wireless communication system according to another exemplary embodiment of the present invention is described in detail below with reference to FIG. 14.

Figure 14:
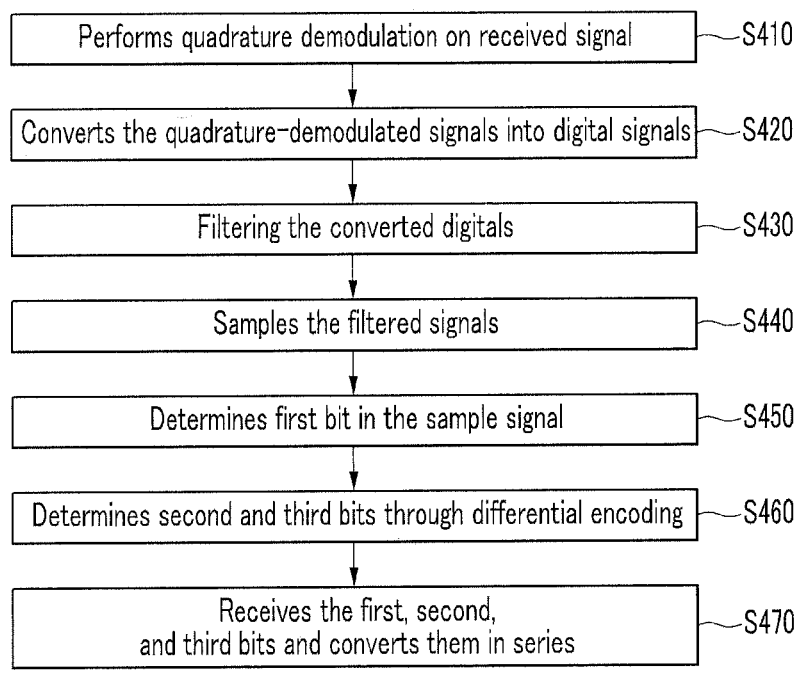
FIG. 14 is a flowchart illustrating a reception method of a wireless communication system according to yet another exemplary embodiment of the present invention.

FIG. 14 is a flowchart illustrating the reception method of the wireless communication system according to yet another exemplary embodiment of the present invention.

Referring to FIG. 14, the quadrature demodulator 210 of the reception apparatus 200 of the wireless communication system performs quadrature demodulation on a signal r(t) received from the transmission apparatus 100 at step S410.

The A/D converters 221 and 222 of the reception apparatus 200 receive the quadrature-demodulated signals and convert the received signals into digital signals at step S420.

The matching filters 231 and 232 filter the converted digital signals and output maximum output values at step S430.

The synchronizer 240 samples the filtered signals at time intervals of $T_s/2$ at step S440.

The comparator 250 receives the sampled signals and determines a first bit forming a symbol at step S450. That is, the comparator 250 finds the magnitude of the signal by finding an absolute value of the sampled signal and determines the first bit of the symbol by comparing the magnitude of an even-numbered signal and the magnitude of an odd-numbered signal, of the sampled signal.

The differential decoder 260 receives the sample signals and determines the second and third bits by performing differential decoding on the received sampled signals at step S460. That is, the differential decoder 260 performs a conjugate complex multiplication on a delayed signal and the signal determined by the comparator 250 to have a greater magnitude, from among the even-numbered signal and the odd-numbered signal, and performs differential decoding using the conjugate complex multiplication.

The parallel-serial converter 270 receives the first bit from the comparator 250 and the second and third bits from the differential decoder 260, converts the first, second, and third bits into a serial signal, and outputs a final signal.

In accordance with some exemplary embodiments of the present invention, in a wireless communication system, a 180° phase shift between symbols can be fundamentally prevented using π/4 phase rotation. Accordingly, the transmission apparatus and the reception apparatus can be implemented to be able to improve the back-off characteristic of a nonlinear element and that are robust to a frequency offset and a frequency shift through a relatively simple asynchronous receiver and that do not require circuits for channel estimation and compensation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmission apparatus, comprising:
a serial/parallel (S/P) converter for converting an input bit stream into symbols comprising 3 bits;
a differential modulator for generating differential encoded symbols by applying π/4 phase rotation to each of the symbols;
up-samplers for up-sampling the differential encoded symbols;
filters for filtering the up-sampled symbols;
digital/analog (D/A) converters for converting the filtered symbols into analog signals; and
a quadrature modulator for performing quadrature modulation on the converted analog signals,
wherein the differential modulator places a symbol waveform in a front part when a first bit of the symbol is 0 and places the symbol waveform in a rear part when a second bit of the symbol is 1.

2. A transmission apparatus, comprising:
a serial/parallel (S/P) converter for converting an input bit stream into symbols comprising 3 bits;
a differential modulator for generating differential encoded symbols by applying π/4 phase rotation to each of the symbols;
up-samplers for up-sampling the differential encoded symbols;
filters for filtering the up-sampled symbols;
digital/analog (D/A) converters for converting the filtered symbols into analog signals; and
a quadrature modulator for performing quadrature modulation on the converted analog signals,
wherein the symbol comprises a first bit and the differential modulator
generates a complex parameter using second and third bits of the symbol and generates a current differential encoded symbol by multiplying a previous differential encoded symbol and the complex parameter, wherein an initial symbol is 1.

3. A transmission apparatus, comprising:
a serial/parallel (S/P) converter for converting an input bit stream into symbols comprising 3 bits;
a differential modulator for generating differential encoded symbols by applying π/4 phase rotation to each of the symbols;
up-samplers for up-sampling the differential encoded symbols;
filters for filtering the up-sampled symbols;
digital/analog (D/A) converters for converting the filtered symbols into analog signals; and
a quadrature modulator for performing quadrature modulation on the converted analog signals,
wherein the symbol comprises a first bit and the differential modulator
generates a complex parameter using second and third bits of the symbol and generates a phase of a current differential encoded symbol by multiplying a phase of a previous differential encoded symbol and a phase of the complex parameter, wherein a phase of an initial symbol is 0°.

4. A method of a transmission apparatus of a wireless communication system transmitting a signal, the method comprising:
receiving an input bit stream;

converting the input bit stream into a plurality of symbols each comprising 3 bits;
generating differential encoded symbols by applying π/4 phase rotation to each of the symbols;
up-sampling the differential encoded symbols;
filtering the up-sampled symbols;
converting the filtered symbols into analog signals; and
performing quadrature modulation on the converted analog signals and transmitting the result,
wherein generating the differential encoded symbols comprises placing a symbol waveform in a front part when a first bit of the symbol is 0 and placing the symbol waveform in a rear part when a second bit of the symbol is 1.

5. A method of a transmission apparatus of a wireless communication system transmitting a signal, the method comprising:
receiving an input bit stream;
converting the input bit stream into a plurality of symbols each comprising 3 bits;
generating differential encoded symbols by applying π/4 phase rotation to each of the symbols;
up-sampling the differential encoded symbols;
filtering the up-sampled symbols;
converting the filtered symbols into analog signals; and
performing quadrature modulation on the converted analog signals and transmitting the result,
wherein the symbol comprises a first bit and generating the differential encoded symbols comprises:
generating a complex parameter using second and third bits of the symbol, and generating a current differential encoded symbol by multiplying a previous differential encoded symbol and the complex parameter,
wherein an initial symbol is 1.

6. A method of a transmission apparatus of a wireless communication system transmitting a signal, the method comprising:
receiving an input bit stream;
converting the input bit stream into a plurality of symbols each comprising 3 bits;
generating differential encoded symbols by applying π/4 phase rotation to each of the symbols;
up-sampling the differential encoded symbols;
filtering the up-sampled symbols;
converting the filtered symbols into analog signals; and
performing quadrature modulation on the converted analog signals and transmitting the result,
wherein the symbol comprises a first bit and generating the differential encoded symbols comprises:
generating a complex parameter using second and third bits of the symbol, and
generating a phase of a current differential encoded symbol by multiplying a phase of a previous differential encoded symbol and a phase of the complex parameter,
wherein a phase of an initial symbol is 0°.

* * * * *